(12) United States Patent
Uskela

(10) Patent No.: US 6,721,886 B1
(45) Date of Patent: Apr. 13, 2004

(54) PREVENTING UNAUTHORIZED USE OF SERVICE

(75) Inventor: Sami Uskela, Helsinki (FI)

(73) Assignee: Nokia Corporation, Espoo (FI)

( * ) Notice: Subject to any disclaimer, the term of this patent is extended or adjusted under 35 U.S.C. 154(b) by 459 days.

(21) Appl. No.: 09/705,032

(22) Filed: Nov. 2, 2000

Related U.S. Application Data

(63) Continuation of application No. PCT/FI99/00432, filed on May 18, 1999.

(30) Foreign Application Priority Data

May 20, 1998 (FI) .................................................. 981132

(51) Int. Cl.$^7$ ................................................ H04L 9/00
(52) U.S. Cl. ...................................... 713/168; 713/171
(58) Field of Search ............................... 380/255, 247, 380/259, 270; 455/410, 411, 414, 558, 418, 419; 713/187, 170, 191; 717/168, 173

(56) References Cited

U.S. PATENT DOCUMENTS

| | | | | |
|---|---|---|---|---|
| 5,159,634 A | * | 10/1992 | Reeds, III | 380/42 |
| 5,303,285 A | * | 4/1994 | Kerihuel et al. | 455/461 |
| 5,511,122 A | * | 4/1996 | Atkinson | 713/153 |
| 5,887,254 A | * | 3/1999 | Halonen | 455/419 |
| 6,009,173 A | * | 12/1999 | Sumner | 713/156 |

FOREIGN PATENT DOCUMENTS

| | | |
|---|---|---|
| DE | 196 47 109 | 5/1998 |
| WO | WO 95/21509 | 8/1995 |
| WO | WO 99/18746 | 4/1999 |

OTHER PUBLICATIONS

International Search Report for PCT/FI99/00432.

* cited by examiner

Primary Examiner—Gregory Morse
Assistant Examiner—Christopher J. Brown

(57) ABSTRACT

A method, a system, a network element and an apparatus of a telecommunication system for preventing unauthorized use of a service. The method, in which a service request is received from a user and the service is generated by means of a service logic, is characterized in that to prevent unauthorized use of the service, authentication data is appended to the service logic, the user requesting the service is authenticated by means of the authentication data, and the service logic is executed only if the authentication succeeds.

20 Claims, 4 Drawing Sheets

PREVENTING UNAUTHORIZED USE OF SERVICE

This is a continuation of PCT/FI99/00432, filed May 18, 1999.

BACKGROUND OF THE INVENTION

The invention relates to preventing unauthorized use of services and especially to preventing unauthorized use of the services in a mobile communication system.

Mobile communication systems were developed, because there was a need to allow people to move away from fixed telephone terminals without affecting their reachability. The services offered through mobile stations have developed along with the mobile communication systems. At the moment, various new forms of service are being planned for the current and particularly for the future third-generation mobile communication systems, such as Universal Mobile Telecommunication System (UMTS) and International Mobile Telecommunication 2000 (IMT-2000). UMTS is being standardized by ETSI (European Telecommunications Standards Institute), whereas ITU (International Telecommunications Union) is standardizing the IMT-2000 system. These future systems are very similar in basic features. The following will describe in greater detail the IMT-2000 system whose architecture is illustrated in FIG. 1.

Like all mobile communication systems, IMT-2000 produces wireless data transmission services to mobile users. The system supports roaming, in other words, IMT-2000 users can be reached and they can make calls anywhere within the IMT-2000 system coverage area. IMT-2000 is expected to fulfil the need for a wide range of future services, such as virtual home environment (VHE). With the virtual home environment, an IMT-2000 user has access to the same services everywhere within the coverage area of the system. According to present knowledge, a flexible implementation of various services and especially supporting roaming requires the loading of certain service logics into the terminal of the user and/or the serving network. A serving network is the network through which the service provider offers his service to the end-user. A service logic is a program, partial program, script or applet related to the service. The service is generated by means of the service logic by executing at least the service logic and the functions defined in it. A service can also comprise several service logics.

A problem with the arrangement described above is that it does not in any way verify that the user really has the right to use the service. It is especially easy to copy and make unauthorized use of services in which the service logic is loaded into the terminal and/or serving network.

BRIEF DESCRIPTION OF THE INVENTION

Thus, it is an object of the invention to develop a method and an apparatus implementing the method so as to solve the above-mentioned problem. The object of the invention is achieved by a method, a system, a network element and an apparatus characterized by what is stated in the independent claims. The term apparatus refers here to a network element of the serving network, a terminal or any other corresponding service platform, into which the service logic can be loaded. The preferred embodiments of the invention are set forth in the dependent claims.

The invention is based on the idea of forming a service logic of two parts: user authentication and the actual service logic. The data required for user authentication is appended to the service logic, and the user is always authenticated before executing the actual service logic. This provides the advantage that an unauthorized use and copying of the service logic can be prevented. Only the users, to whom the service is subscribed and who thus have the right to use the service, can use it.

In a preferred embodiment of the invention, the service provider is always verified before the service is executed. This improves considerably the security of the user and a possible service platform into which the service logic is loaded. This ensures that the service logic truly originates from the service provider.

In a preferred embodiment of the invention, subscriber identification used to individualise a user is used in user authentication. This provides the advantage that subscriber authentication is simple, but reliable.

In a preferred embodiment of the invention, the service logic is saved with its user and authentication data in the memory of the service platform where it is loaded, and for a new user, only the authentication data of the new user is loaded. This provides the advantage that the service logic need not be loaded several times consecutively, which reduces the network load.

BRIEF DESCRIPTION OF THE DRAWINGS

In the following, the invention will be described in more detail in connection with preferred embodiments and with reference to the attached drawings in which.

DETAILED DESCRIPTION OF THE INVENTION

The present invention can be applied to any data transmission system in which the user can receive the subscribed services in any terminal supporting service provision. In the following, the invention will be described using the IMT-2000 system as an example, without limiting the invention to this particular system, however. The specifications of mobile communication systems in general and those of the IMT-2000 and UMTS system in particular evolve rapidly. This evolution may require extra changes to the invention. Therefore, all terms and expressions should be interpreted as widely as possible and they are intended to describe and not to limit the invention. It is the function that is essential for the invention and not in which network element or apparatus it is executed.

Figure 1:
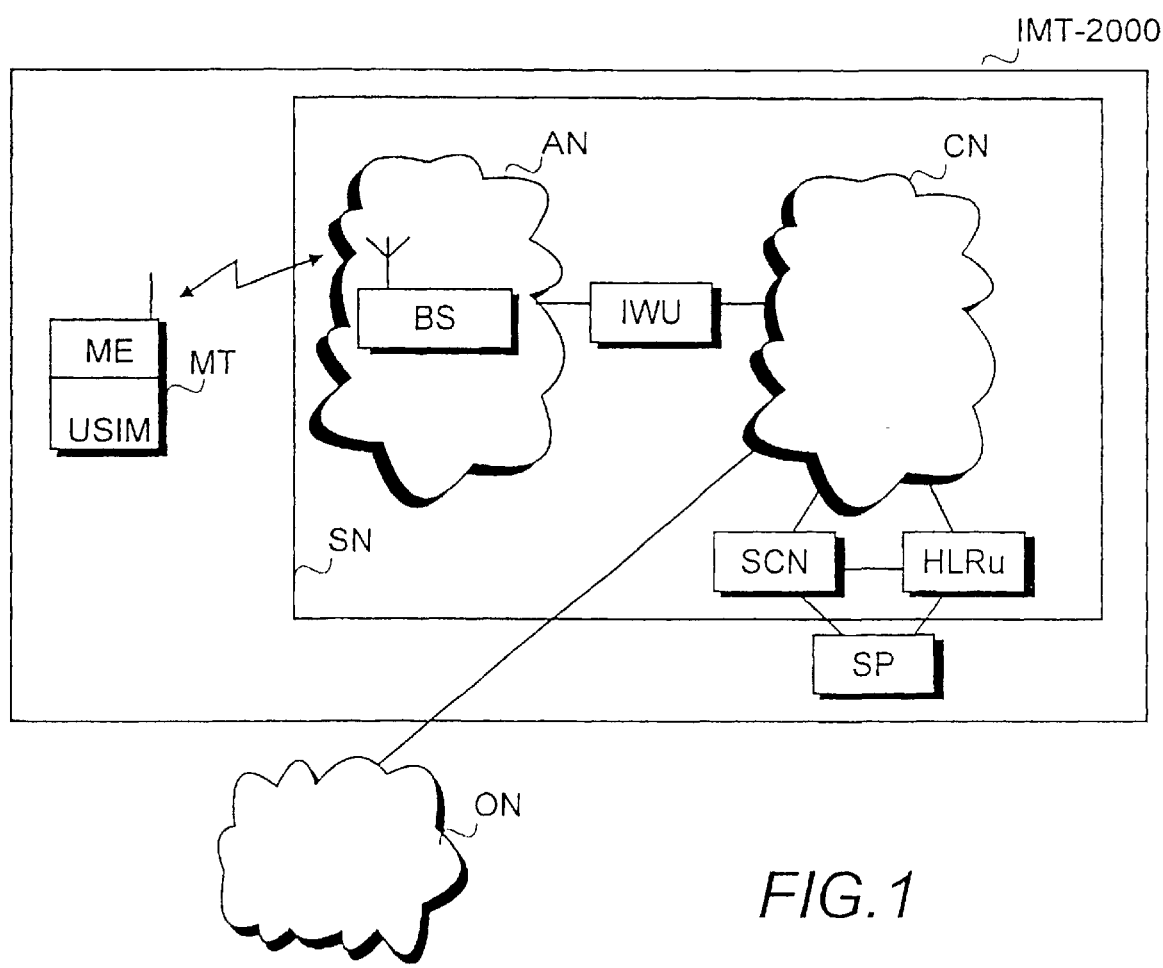
FIG. 1 illustrates the IMT-2000 architecture.

FIG. 1 shows the network architecture of the IMT-2000 system on a general level, because the system specifications are currently being defined. A more detailed network structure bears no essential significance with regard to the invention. Third-generation mobile communication systems separate a service provider SP and a network operator from each other. A service provider offers services to an end-user through a network SN of one or more network operators. This type of network SN is called a serving network. A service provider can offer services through a serving network SN of one or more network operators. In addition, a service provider may switch to another serving network during the service without the user noticing it. A service provider can also be a network operator. A serving network SN comprises an actual access network AN, one or more core networks CN, and an interworking unit adapting interfaces IWU for each different type of core network. According to present knowledge, an access network comprises base stations BS and radio network controllers RNC controlling them (not shown in the figure). A core network can be a network according to the pan-European mobile communication system GSM (Global System for Mobile Communication). Connections to other networks ON are established through a core network CN.

In the example in FIG. 1, a home location register with IMT-2000 enhancement HLRi and the service control node SCN have been located in the serving network SN. The enhanced home location register HLRi contains not only the home register data of the core network but also the subscriber and service data required by the IMT-2000 system. The service provider SP maintains this IMT-2000 data for the part of the services. The subscriber makes an order agreement with the service provider which then charges the subscriber for the use of the services. The service control node SCN is a service platform to which the service logic related to the service can be loaded and in which it can be executed. The service control node SCN can also take care of loading the service elsewhere in the network and forward service requests from the user to the service provider. In addition to this, the service control node SCN makes sure that the services of the home network are also available in the visited networks.

In third-generation mobile communication networks, subscriber and user are also separated. The subscriber grants the user access to the subscribed services by giving the user an identification card (IC Card), for instance a USIM card (User and Services and Identity Module). The user accesses the services with a mobile terminal MT which is connected through base stations BS to a serving network SN over a radio path. A mobile terminal MT comprises actual mobile equipment ME and a detachably connected identification card USIM, also called a subscriber identity module. It is a smart card which can be detached from the mobile terminal and with which the subscriber can use a card-controlled mobile terminal. The user is identified by the card in the mobile terminal and not by the terminal itself. According to present knowledge, the USIM card is a multi-functional card and supports mobile communication system applications and other applications, such as Java applications, healthcare applications, etc. The subscriber can subscribe to the services of several different service providers with the same subscriber identity module USIM. The subscriber and the user can be one and the same person. The subscriber identity module USIM also contains an international mobile subscriber identity IMSI with which the subscriber can be explicitly identified and which can also be used to identify the user. The identifier of a mobile subscriber is called subscriber identity.

The terminal selection of third-generation systems will probably be extremely versatile. The terminal-can be a simplified terminal for speech only or it can be a terminal providing diverse services, which acts as a service platform and supports the loading and execution of various service logics.

A mobile communication system implementing the functionality of the present invention comprises not only means required for generating and loading services according to prior art, but also means for appending authentication data to a service logic and means for authenticating the user prior to executing the service logic. Here, appending also refers to embedding data into the service logic. In addition, the system can comprise means for verifying the service provider and means for saving the service logic with its supplementary data into the memory and means for receiving plain authentication data. The means for appending authentication data and the possible means for appending verification data are preferably located together with the means required for loading the service logic of the service provider. The other means are preferably located on the service platform, for instance in the terminal or the service control point of the network operator. The means or a part of them can also be located elsewhere, for instance in the network node of the subscriber network or in the serving support node of the core network.

Figure 2:
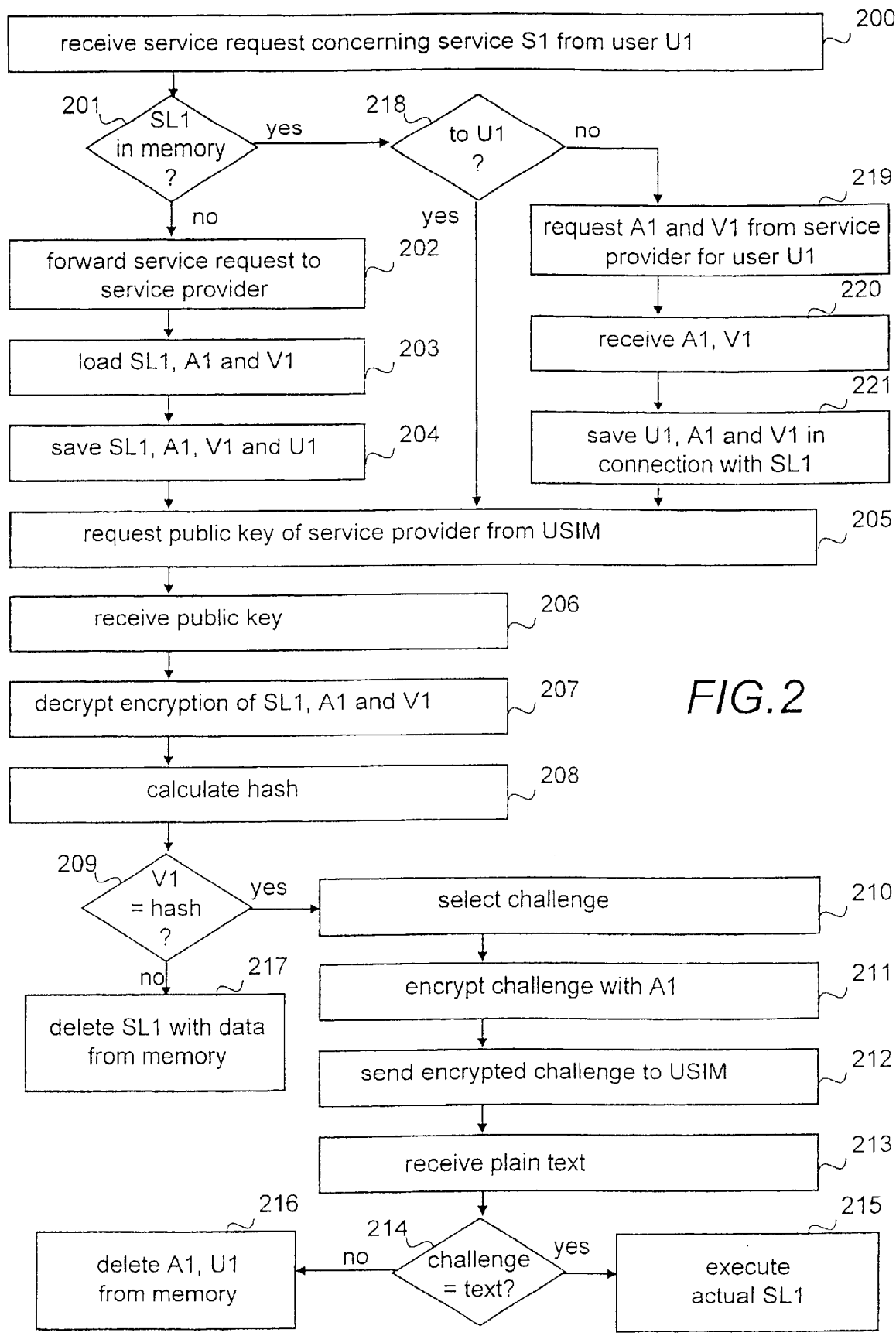
FIG. 2 shows a flow chart of the service platform functions in a first preferred embodiment of the invention.

FIG. 2 shows a flow chart of the operation according to the first preferred embodiment of the invention on a service platform which can be actual mobile equipment ME or a service control node SCN, for instance. In the first preferred embodiment of the invention, an encryption technique, known per se, based on public keys is utilized in a novel and inventive manner. One such encryption technique is RSA (Rivest Shamir Adleman public-key cryptographic algorithm) which can be used for both encryption and digital signature. In the first preferred embodiment of the invention, at least the secret key of the subscriber and the public key of the service provider are saved in the subscriber identity module USIM. If the subscriber has several key pairs, the secret key of the pair, whose public key has been entered in the subscriber data of the user, is saved. Correspondingly, a service provider can have several key pairs of which one, for instance, is saved in the subscriber identity module and information on the pair, whose key is saved in the identity module, is entered in the subscriber data. This ensures that the secret and public key of the same pair is used. In the first preferred embodiment of the invention, the service provider is verified by a digital signature. It is generated in the first embodiment of the invention by calculating a one-way hash (one-way hash function) from the service logic, which is then encrypted. This embodiment provides the unexpected advantage that in connection with the verification of the service provider, the fact whether the service logic has been changed, is also checked. If the service logic has been changed, the hash calculated from it also changes and the service provider verification does not succeed anymore.

With reference to FIG. 2, a service request concerning a service S1 is received from a user U1 in step 200. In step 201, a check is made to see whether the service logic SL1 related to the service S1 is in the memory. If it is not, the service request is forwarded to the service provider in step 202. The service provider finds the actual service logic SL1 related to the service S1 and appends to the service logic authentication data A1 required for user authentication, which in the first preferred embodiment is the public key of the subscriber. After this, the service provider calculates the hash from the actual service logic and the authentication data and appends it as verification data V1 to the service logic and encrypts the thus created file with its own secret key. The file contains the verification data V1, the authentication file A1 and the actual service logic SL1. Alternatively, the service provider could encrypt the hash with its secret key, append the encrypted hash as the verification data V1 to the file and then encrypt the file with the public key of the user. After this, in step 203, the file, i.e. the actual service logic SL1 related to the service S1, the authentication data A1 appended to it for the user U1, and the verification data V1 calculated from them, is loaded onto the service platform. In step 204, the service logic SL1 is saved and in it, the authentication data A1 and the verification data V1 related to the user U1, and, of course, information on the user U1 to which the authentication data A1 and the verification data V1 are related. The data is stored in encrypted format in the memory. Then, in the first preferred embodiment, the public key of the service provider is requested from the subscriber identity module USIM in the terminal of the user in step 205 and received in step 206, after which the encryption of the service logic SL1, the authentication data A1 and the verification data V1 is decrypted in step 207 using the received key. In embodiments in which the service provider only has one key pair, the information on the public key of the provider can already be on the service platform and need not be separately requested. When the encryptions have been decrypted, the service provider is verified by calculating a hash from the service logic and the authentication data in step 208 and by comparing the thus calculated hash with the verification data V1 in step 209. If they are the same, the verification of the service provider succeeds, and after this, a challenge, i.e. a character string, is selected in step 210. How the challenge is selected bears no significance with regard to the invention. A simple and safe solution is to use a random number generator, whereby the challenge is a random number. The selected challenge is encrypted in step 211 with the public key of the subscriber, i.e. the authentication data A1. After this, in step 212, the encrypted challenge is sent to the subscriber identity module USIM in the terminal of the user U1, which decrypts the encrypted challenge into plain text with the secret key of the subscriber and sends the plain text back to the service platform. In step 213, the service platform receives the plain text and in step 214, it compares the original challenge with the plain text. If the character strings are the same, user authentication succeeds and the actual service logic SL1 can be executed in step 215.

If it is detected in step 209 that the calculated hash is not the same as the verification data, the service provider verification fails or the service logic has been changed. In both cases, executing the service logic would be a security risk and, therefore, it is not executed, and in step 217, all data saved for the service S1, i.e. the service logic SL1 and all appended authentication and verification data with user data, is deleted from the memory.

If it is detected in step 214 that the challenge is not the same as the plain text, authentication does not succeed and the service logic is not executed, and in step 216, the authentication data A1, verification data V1 and information on the user U1 appended to the service logic SL1 of the service S1, is deleted from the memory. This way, the actual service logic SL1 need not be loaded next time, only the authentication data and verification data.

If it is detected in step 201 that the service logic SL1 related to the service S1 is in the memory, a check is made in step 218 to see if authentication and verification data for the user U1 is appended to it. If this data, too, is in the memory, operation continues from step 205 where the public key of the service provider is requested from the subscriber identity module USIM. From step 205 onward, operation continues as described above. This way, network resources are saved, because the once loaded data need not be loaded again.

If it is detected in step 218 that no authentication and verification data for the user U1 is appended to the service logic SL1 in the memory, in step 219, the authentication and verification data for the service S1 is requested from the service provider for the user U1. The authentication data A1 and the verification data V1 are received in step 220, after which they and information on the user U1 are appended to the service logic SL1 in step 221. After this, operation continues from step 205 where the public key of the service provider is requested from the subscriber identity module USIM. From step 205 onward, operation continues as described above.

The service platform can be actual mobile equipment ME or a network element of the serving network, such as the service control node SCN. The memory where the data and service logics are saved can also be a cache memory. In embodiments in which the service logic is saved in the memory, the service platform can comprise means for deleting the service logic from the memory for predefined reasons, for instance after a certain time period.

In embodiment in which the service logic is not saved in the memory, steps 200, 202, 203 and 205 to 215 are executed. The data deletion described in steps 216 and 217 is not done, but the actual service logic is left unexecuted.

The steps described above in FIG. 2 are not in absolute chronological order and some of the steps can be executed simultaneously or deviating from the given order. Other functions can also be executed between the steps. Some of the steps, such as the service provider verification, can also be left out. The essential thing is to authenticate the user before the actual loaded service logic is executed.

Figure 3:
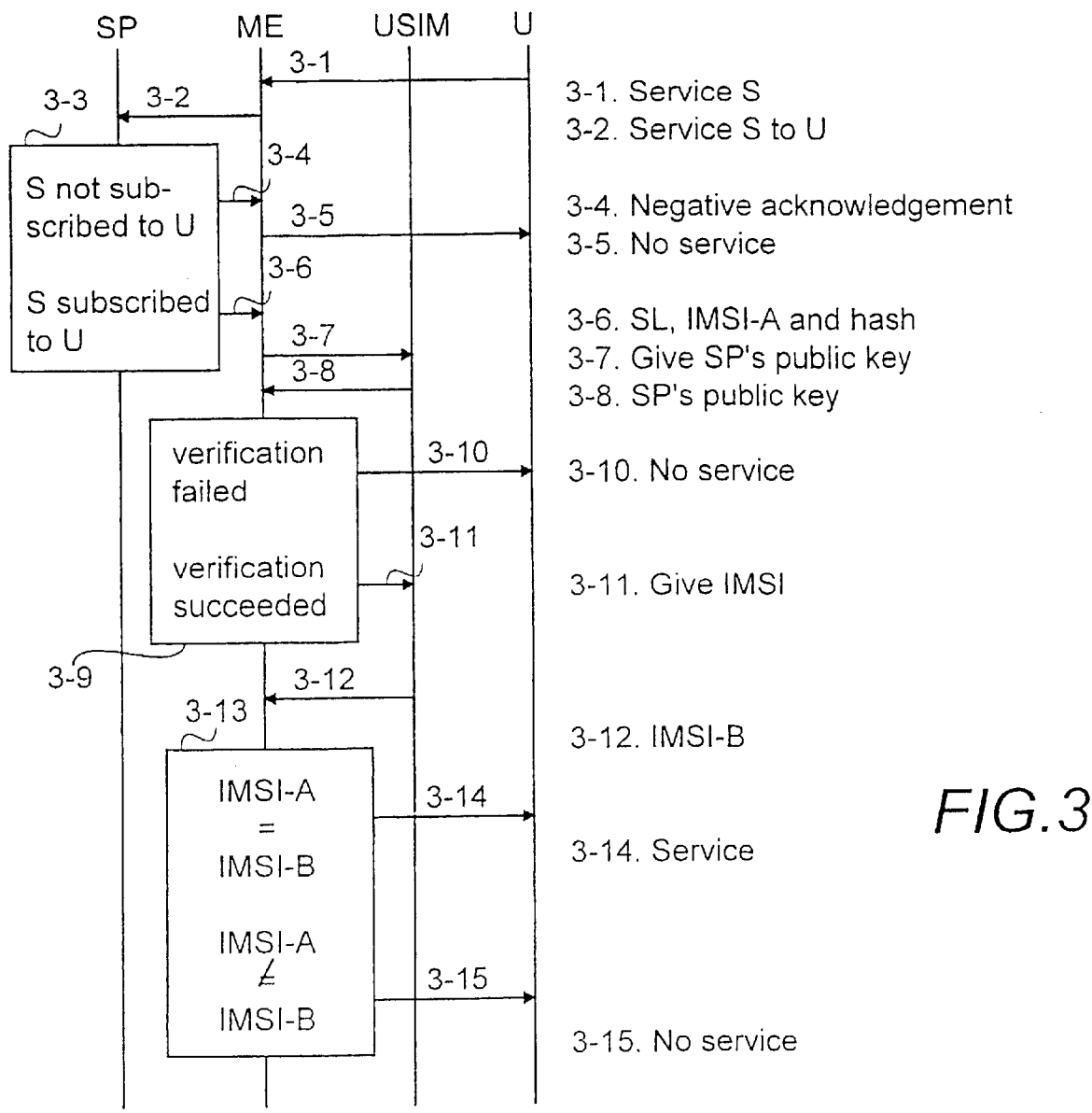
FIG. 3 is a signalling diagram of a second preferred embodiment of the invention.

FIG. 3 shows signalling according to a second preferred embodiment of the invention. In the second preferred embodiment, the subscriber identification IMSI is used as the authentication data. It is also assumed that the service logic is loaded into the actual mobile equipment ME and not saved in its memory.

With reference to FIG. 3, user U sends information in message 3-1 to mobile equipment ME through the user interface requesting service S. The mobile equipment ME sends the service request through the serving network to service provider SP in message 3-2. The service request contains information on the required service S and the user U requesting the service. In step 3-3, the service provider checks if the service S is subscribed to the user U. If the service S is not subscribed to the user, the service provider sends through the serving network a negative acknowledgement to the service request in message 3-4 to the mobile equipment ME which forwards the information in message 3-5 through the user interface to the user U.

If the service S is subscribed to the user, the service provider retrieves the subscriber identification IMSI-A of the user U and the service logic SL related to the service S and calculates a hash from them. After this, the service provider encrypts the service logic and the related data (IMSI-A, hash) with the secret key of the service provider. In message 3-6, the service provider sends the service logic SL, the identification IMSI-A and the hash to the mobile equipment ME. In the second preferred embodiment, after receiving the message 3-6, the mobile equipment ME requests the public key of the service provider from the subscriber identity module USIM in message 3-7. The subscriber identity module USIM sends it to the mobile equipment in message 3-8, after which the mobile equipment ME verifies the service provider in step 3-9. The mobile equipment decrypts the encryption of the service logic SL, the subscriber identification A1 and the hash with the received public key and calculates a hash from the combination of the service logic and the subscriber identification IMSI-A. If the calculated hash is not the same as that received in message 3-6, the verification fails. In such a case, the service logic is not executed and the mobile equipment ME sends information on the verification failure through the user interface to the user U in message 3-10, saying, for instance, that the service is not available.

If the hash calculated in step 3-9 and the received hash are the same, the verification succeeds and the mobile equipment ME requests the subscriber identification IMSI of the user U from the subscriber identity module USIM in message 3-11. The subscriber identity module USIM retrieves the subscriber identification IMSI-B from its memory and sends it to the mobile equipment ME in message 3-12. In step 3-13, the mobile equipment authenticates the user by checking if the IMSI-A received from the service provider is the same as the IMSI-B received from the identity module. If the user passes the authentication in step 3-9 (i.e. IMSI-A is the same as IMSI-B), the mobile equipment ME executes the actual service logic SL and provides the service through the user interface to the user U in messages 3-14. If the values of the subscriber identifications IMSI differ from each other, authentication fails. In such a case, the mobile equipment does not execute the actual service logic, but informs the user U through the user interface in message 3-10 that the authentication failed, saying, for instance, that the service is not available.

The signalling messages described above in connection with FIG. 3 are for reference only and can contain several separate messages to forward the same information. In addition, the messages can also contain other information. The messages can also be freely combined. In embodiment in which the service provider is not verified, the messages 3-7, 3-8 and 3-10 related to verification and step 3-9 are left out. Depending on the service providers, core network and mobile equipment, other network elements, to which various functionalities have been distributed, can take part in the data transmission and signalling.

Figure 4:
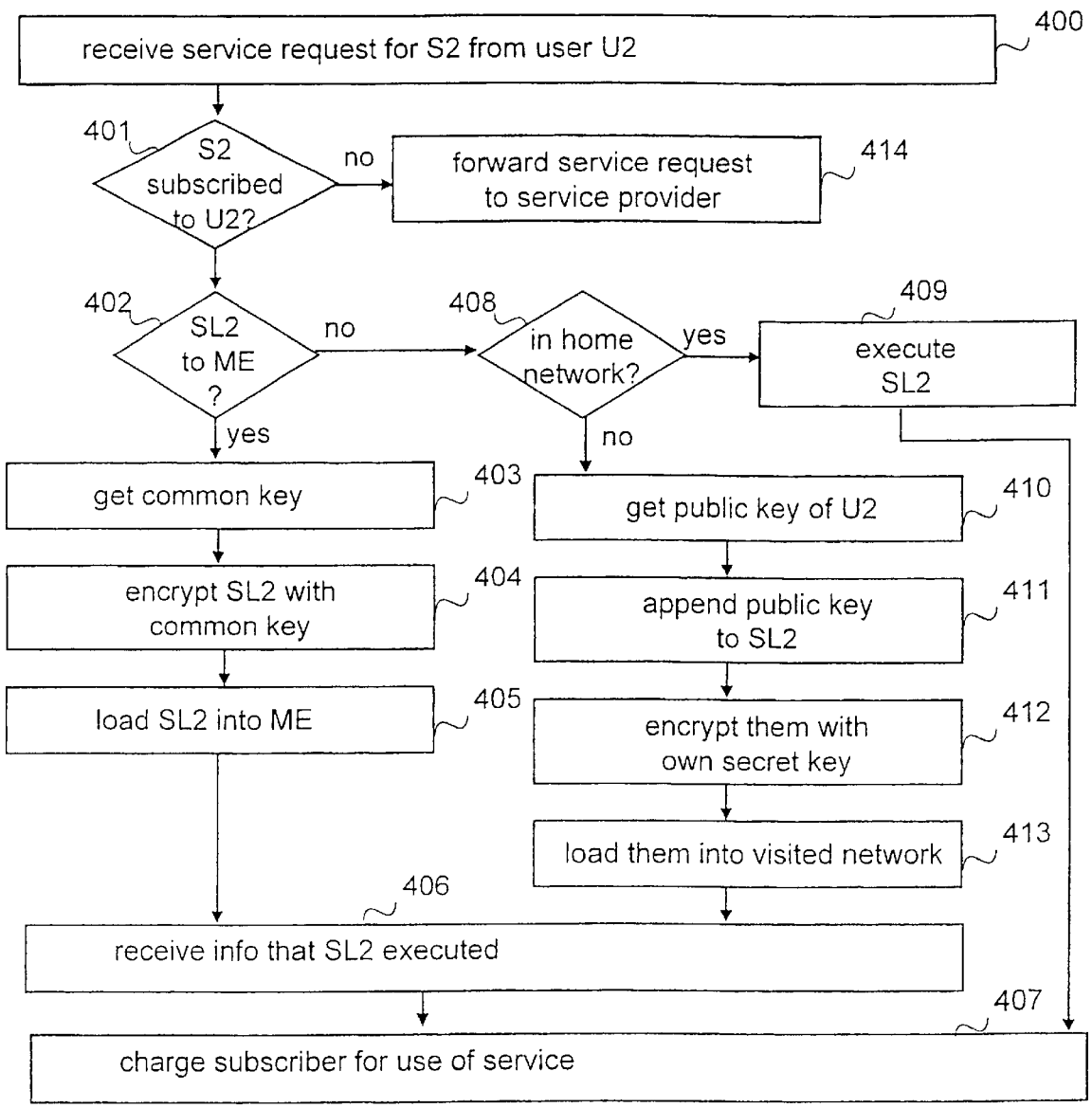
FIG. 4 shows the operation of a network element controlling a service of a service provider in a third preferred embodiment of the invention.

FIG. 4 shows a flow chart of a network element controlling a service of a service provider in a third preferred embodiment of the invention. In the third preferred embodiment, authentication and verification are only performed when a service logic is loaded into a visited (visiting) network or mobile equipment. The visited network is a network whose network element, into which the service is loaded, is a network element belonging to a provider other than the service provider. The third preferred embodiment utilizes both public key encryption and symmetrical encryption, such as DES (Data Encryption Standard). The latter encryption technique is used when the service logic is loaded into the mobile equipment. A common key is saved for it in both the subscriber identity module and the subscriber data of the user. In addition, the public key of the service provider is saved in the subscriber identity module for the service logics to be loaded into visited networks. Only encryption of the service logic with the secret key of the service provider prior to sending the service logic to the serving network or encryption with the common key prior to loading it in the mobile equipment is used as signature.

With reference to FIG. 4, in step 400, a service request concerning a service S2 is received from a user U2. In step 401, a check is made to see if the user U2 subscribes to the service S2. If the user subscribes to the service S2, a check is made in step 402 to see if the service logic SL2 related to the service U2 requires loading into the mobile equipment ME of the user. If the service logic SL2 is loaded into the mobile equipment of the user, in step 403, a common key is retrieved from the subscriber data of the user U2 for encrypting the service logic SL2 in step 404. This common key is used both as the authentication data of the user and the verification data of the service provider. Nobody else should have any information on the common key in this case. The authentication and verification are performed in connection with the decryption of the service logic. The encrypted service logic SL2 is loaded into the mobile equipment ME in step 405. The user is authenticated and the service provider is verified in the mobile equipment, for instance by sending the encrypted service logic to the subscriber identity module USIM in the mobile equipment, which decrypts the service logic using the common key in its memory and sends the plain-text service logic to the mobile equipment. When the service logic has been executed, information concerning this is received in step 406, and the subscriber is charged for the use of the service in step 407.

If it is detected in step 402 that the service logic SL2 will not be loaded into the mobile equipment, a check is made in step 408 to see if the user U2 is in the home network area. If yes, the service logic SL2 is executed in step 409, after which operation continues from step 407 in which the user is charged for the use of the service.

If it is detected in step 408 that the user is not in the home network area, in the third preferred embodiment of the invention, the service logic SL2 must be loaded into the visited network. To do this, in step 410, the public key of the user U2 is retrieved from the subscriber data for appending it as authentication data to the service logic. In step 411, the public key of the user is appended to the service logic SL2, and they are encrypted using the secret key of the service provider in step 412. The encryption also acts as the verification data. If the service provider has several key pairs of public and secret keys, the secret key of the pair whose public key has been saved in the identity module of the user is used. The encrypted service logic, to which the authentication data is appended, is loaded into the visiting network in step 413. The network element of the visiting network verifies the service provider by decrypting the service logic using the public key of the service provider and authenticates the user, for instance in the manner described in connection with FIG. 2, after which the service logic is executed. When the service logic has been executed, information concerning this is received in step 406, and the subscriber is charged for the use of the service in step 407.

If it is detected in step 411 that the requested service is not subscribed to the user, information is transmitted in step 414 that the service is not available to the user.

Above, in connection with FIG. 4, it was assumed that the authentication and verification succeeded. If this is not the case, the service logic is not executed and the subscriber not invoiced. The steps described above in connection with FIG. 4 are not in absolute chronological order and some of the steps can be executed simultaneously or deviating from the given order. Other functions can also be executed between the steps. Some of the steps can also be left out. The essential thing is that the authentication data is in some way appended to the service logic being loaded.

In the above embodiments, the actual service logic has been changed to ensure that the authentication and verification are done. This has been done by adding to the service logic a part taking care of the authentication and verification, which is always executed before the service logic. In some embodiments, the service logic can only be changed to ensure the authentication. In some embodiments, there is no need to change the service logic, and the authentication data and the possible verification data are appended to the service logic as separate data, and the service platform makes sure that the authentication and the possible verification are done.

In these embodiments, pre-encrypted service logics can be used, which reduces the load of the network element, because encryption is done only once.

It has been assumed above in connection with FIGS. 2, 3 and 4 that the service provider appends the authentication data to the service logic before the encryption. The authentication data can also be appended to a pre-encrypted service logic. In such a case, the serving network or mobile equipment can also be adapted to append the authentication data to the service logic, for instance by means of the user data provided in the service request. It has been presented above that the user is authenticated only after the verification. However, the order bears no significance with regard to the invention. The user can be authenticated before the service provider is verified in embodiment in which the service provider is also verified. The data and/or service logic also need not be encrypted unless the encryption is used for authentication and/or verification. Other alternatives for authentication, verification and possible encryption than those described above in connection with the preferred embodiments can also be used. The preferred embodiments can also be combined. The essential thing is that the user is authenticated before executing the service logic at least when the service logic is loaded into the mobile equipment or visiting network. In embodiment in which the service logic is loaded into the mobile equipment, the encryption of the service logic with the public key of the subscriber can also be used as the authentication data. The subscriber is authenticated when the identity module USIM decrypts the encryption with the secret key of the subscriber. For security's sake, it is advantageous that USIM never sends even to the mobile equipment the secret key saved in it, and the decryption with the secret key is always performed in USIM. Other data for authentication and possible verification than used in the above examples can also be used. The requirements for the authentication data and possible verification data are adequate individualization, reliability and non-repudiation. Adequate individualization means that the data specifies the user at least by subscriber.

No hardware changes are required in the structure of the serving network. It comprises processors and memory that can be utilized in functions of the invention. All changes required for implementing the invention can instead be made as additional or updated software routines in the network elements into which the service logic is loaded. An example of such a network element is the service control node. Extra memory is also needed in the network element saving the loaded service logic with its supplementary data.

The structure of the service provider also requires no hardware changes. The service provider comprises processors and memory that can be utilized in functions of the invention. All changes required for implementing the invention can be made as additional or updated software routines to achieve the functionality of the invention. Extra memory may be needed depending on the embodiment of the invention. It is, however, limited to a small amount sufficient for saving the extra authentication data and the possible verification data.

The structure of the mobile equipment requires no hardware changes. It comprises processors and memory that can be utilized in functions of the invention. All changes required for implementing the invention can instead be made as additional or updated software routines in the mobile equipment which is adapted to function as a service platform. If the service logic is saved in the mobile equipment, extra memory is also needed.

In the subscriber identity module USIM, the extra memory possibly needed for implementing the invention is limited to a small amount sufficient for saving the extra authentication data, the possible verification data and the decryption algorithms possibly needed.

It will be understood that the above description and the figures related to it are only presented for the purpose of illustrating the present invention. The various modifications and variations of the invention will be obvious to those skilled in the art without departing from the scope or spirit of the invention disclosed in the attached claims.

What is claimed is:

1. A method for preventing unauthorized use of a service generated by means of a service logic in a mobile communication system, wherein user-specific authentication data is stored in subscription information of the user in which method a service request is received from a user of the service, said user-specific authentication data is appended to the service logic, the user requesting the service is authenticated by means of said appended user-specific authentication data, and the service logic is executed only if the authentication succeeds.

2. A method as claimed in claim 1, wherein verification data of the service provider is also appended to the service logic, the service provider is verified in connection with user authentication, and the service logic is executed only if the verification also succeeds.

3. A method as claimed in claim 2, wherein a first hash calculated from the service logic is used as verification data of the service logic, the service logic is loaded onto a service platform where it is executed to generate the service, the service provider is verified on the service platform by calculating a second hash from the service logic, and if the first and the second hash are the same, the verification succeeds, if the first and the second hash differ, the verification fails.

4. A method as claimed in claim 2, wherein the signature of the service provider is used as the verification data, the service logic is signed by encrypting it with the secret key of the service provider, and the service provider is verified by decrypting the encryption of the service logic with the public key of the service provider.

5. A method as claimed in claim 1, wherein a secret key of a subscriber is saved in a subscriber identity module of the user of the service, a public key of the subscriber is used as said user-specific authentication data, a challenge encrypted with the public key of the subscriber is sent to the subscriber identity module located in the mobile equipment of the user requesting the service, the challenge is decrypted into plain text with the secret key of the subscriber in the subscriber identity module, plain text is received from the identity module, a check is made to see if the unencrypted challenge and the plain text correspond to each other, and if they correspond, the authentication succeeds, and if they do not correspond, the authentication fails.

6. A method as claimed in claim 1, wherein individual identity of the subscriber is used as said user-specific authentication data, a service request is received from the user, the individual subscriber identity related to the user is requested, the requested identity is received, a check is made to see if said user-specific authentication data and the requested identity correspond to each other, and if they correspond, the authentication succeeds, and if they do not correspond, the authentication fails.

7. A method as claimed in claim 1, wherein the service logic is loaded onto the service platform where it is executed to generate the service, and said user-specific authentication data is appended to the service logic in connection with the loading.

8. A method as claimed in claim 7, wherein the service logic, said user-specific authentication data appended to it, and the data indicating the user are saved on the service platform in connection with the loading, a service request is received from the user, a check is made to see if the service logic related to the requested service is saved on the service platform, and (A) if not, the service logic is loaded, (B) if yes,
   (1) a check is made to see if user-specific authentication data has been saved for the user requesting the service, and
      (a) if yes, the user is authenticated,
      (b) if not,
         (i) user-specific authentication data is requested for the user,
         (ii) said user-specific authentication data and the data indicating the user are saved in the service logic, and
         (iii) the user is authenticated.

9. A telecommunication system comprising a first part configured to produce a service for a user by means of a service logic, and a second part to provide the service to the user of the service, wherein the first part is adapted to identify the user requesting the service and to check, if the service is subscribed to the user, and if the service is subscribed to the user, to append user-specific authentication data into the service logic for user authentication, the user-specific authentication data being stored in subscription information maintained in the telecommunication system, and to generate the service by loading the service logic into the second part, and the second part is adapted to authenticate the user by means of the appended user-specific authentication data and to provide the service by executing the loaded service logic only in response to a successful authentication.

10. A system as claimed in claim 9, wherein the first part is adapted to sign the service logic by encrypting it with an encryption key agreed with the second part, and the second part is adapted to verify the first part by decrypting the encryption of the service logic with a key corresponding to the agreed encryption key and to execute the service logic only if the verification also succeeds.

11. A system as claimed in claim 9, wherein the telecommunication system is a mobile communication system comprising at least one service provider and serving network, wherein the first part is the service provider, and the second part is the serving network comprising at least one network element.

12. A system as claimed in claim 9, wherein the telecommunication system is a mobile communication system comprising at least one service provider and mobile terminal which is connected to the service provider through a serving network and which mobile terminal comprises in addition to mobile equipment a subscriber identity module which is detachably connected to the mobile equipment, wherein the first part is the service provider, and the second part is the actual mobile equipment.

13. A network element generating a telecommunication system service for a user, the network element producing the service by means of a service logic and comprising means for identifying the user requesting the service, means for checking if the service is subscribed to the user, means for loading the service logic into the telecommunication system if the service is subscribed to the user, and means for appending user-specific authentication data to the service logic being loaded so that the user of the service is authenticated before the service logic is executed, the user-specific authentication data being stored in subscription information maintained in the telecommunication system.

14. A network element as claimed in claim 13 further comprising means for signing the service logic before it is loaded into the network.

15. A network element as claimed in claim 13 further comprising at least one processor arranged to execute software routines, wherein said means for identifying, means for checking, means for loading and means for appending comprise one or more respective software routines.

16. An apparatus of a telecommunication system, which apparatus comprises:

loading means for loading a service logic for providing a service from a service provider of the telecommunication system to a user of the service, separation means for separating user-specific authentication data of the user from the loaded service logic, authentication means, responsive to the separation means, for user authentication, and service logic executing means, responsive to the authentication means, for executing the loaded service logic.

17. An apparatus as claimed in claim 16 further comprising:

verification means for service provider verification based on verification data in the loaded service logic, and adapted to be responsive to the authentication means.

18. An apparatus as claimed in claim 16 comprising a processor arranged to execute software routines, and wherein said separation, authentication and service logic executing means are implemented as software routines.

19. An apparatus as claimed in claim 16, the apparatus being a network element adapted to function as a service platform in the telecommunication system.

20. An apparatus as claimed in claim 16, the apparatus being mobile equipment in the telecommunication system.

* * * * *